(12) United States Patent
Hildebrandt (10) Patent No.: US 6,464,195 B1
(45) Date of Patent: Oct. 15, 2002

(54) ERGONOMIC MOUNTING FOR COMPUTER SCREEN DISPLAYS

(76) Inventor: Raymond Hildebrandt, 7213 Huntcliff, W. Bloomfield, MI (US) 48322

( * ) Notice: Subject to any disclaimer, the term of this patent is extended or adjusted under 35 U.S.C. 154(b) by 0 days.

(21) Appl. No.: 09/504,536

(22) Filed: Feb. 15, 2000

Related U.S. Application Data (63) Continuation-in-part of application No. 09/105,311, filed on Jun. 26, 1998, now abandoned.
(60) Provisional application No. 60/067,469, filed on Dec. 4, 1997.

(51) Int. Cl.[7] ................................................ A47B 97/04
(52) U.S. Cl. ........................ 248/460; 248/920; 248/923; 361/681
(58) Field of Search ................................ 361/680, 681, 361/682, 683, 686; 248/460, 919, 920, 921, 922, 923, 917, 918; 345/179, 905

(56) References Cited

U.S. PATENT DOCUMENTS

| | | | | |
|---|---|---|---|---|
| 5,168,426 A | * | 12/1992 | Hoving et al. | |
| 5,255,214 A | * | 10/1993 | Ma | |
| D366,032 S | * | 1/1996 | Soderburg | |
| 5,481,430 A | * | 1/1996 | Miyagawa et al. | |
| 5,494,447 A | * | 2/1996 | Zaidan | |
| D373,347 S | * | 9/1996 | Ashley et al. | |
| 5,682,645 A | * | 11/1997 | Watabe et al. | |
| 5,844,543 A | * | 12/1998 | Tamura et al. | |
| 5,900,848 A | * | 5/1999 | Haneda et al. | |
| 6,168,124 B1 | * | 1/2001 | Matsuoka et al. | |
| 6,272,006 B1 | * | 8/2001 | Lee | |

* cited by examiner

*Primary Examiner*—Korie Chan
(74) *Attorney, Agent, or Firm*—John R. Benefiel (57) ABSTRACT

An ergonomic mounting arrangement for a hinged screen display for a computer, particularly a notebook or laptop computer, that will provide an option to shift the display screen to an extended position for easier viewing, and also allowing tilting the screen display back as desired. The screen display is mounted to one or more hinged support members which can be swung up from the computer casing, the screen display extendible on the support member or members to be shifted upwardly and forwardly closer to the user's eyes. A pivotal connection allows tilt adjustment on the support member or members.

9 Claims, 12 Drawing Sheets

Fig. 11-E

ERGONOMIC MOUNTING FOR COMPUTER SCREEN DISPLAYS

CROSS REFERENCE TO RELATED APPLICATIONS

This application claims priority of provisional application serial no. 60/067,469, filed on Dec. 4, 1997, and is a continuation-in-part of application Ser. No. 09/105,311, filed on Jun. 26, 1998 now abandoned.

BACKGROUND OF THE INVENTION

This invention relates to a mounting for computer screen displays, and particularly for notebook and laptop computers.

Ever since the introduction of the personal computer there has been a recognition that postural and visual strain are caused by extended viewing of the screen display as currently mounted, i.e., a simple hinging of the screen housing to the rear of the computer casing. Various devices in the past have been invented to alleviate these problems when using the full size personal computer. Most of these efforts have comprised a mounting that allows adjusting the tilt position of the monitor to reduce visual and postural strain.

In the notebook or laptop computer, the problem is more severe and has remained unsolved. While some inventors have recognized the need, no practical solution has been developed. The use of a portable shelf or screen tilting levers proposed in early efforts at portability have been found to be impractical. Manufacturers and users have come to accept these postural and visual problems as disadvantages to be tolerated to gain the convenience of compactness and portability of the laptops.

As an example, U.S. Pat. No. 5,590,607, issued Jan. 7, 1997, for a "Portable Shelf For Notebook Computers" recognizes the difficulties of long term use of a laptop, and provides a portable support shelf to adjust the computer's height. The inventor cites the advantage of using the shelf to raise the keyboard higher than the user's lap, but lower than normal desk top height. An important disadvantage is the lack of portability since it defeats the main advantage of using a notebook or laptop computer. There are two more serious drawbacks, which are important to appreciate, because they bring to light two serious drawbacks of notebook or laptop computer use. The first is that by lowering the keyboard below desk height to better accommodate wrist use, the postural strain on the back, and especially the neck, are actually increased over desk height use. It is a strain to try to view the screen at a low position even at desk top level. The second is that visual details of the display screen are made more difficult to distinguish when the screen is lowered. What would instead be helpful would be to raise the display screen about six inches above desk height and move it closer to the eyes. But if a portable shelf is used, or any means to raise the whole computer much above desk height, it would then make using the hands and wrists almost impossible.

In the context of personal computers and monitors, the art has recognized the advantages of screen position adjustment. A prior patent for "A Compact Electronic Computer", U.S. Pat. No. 4,852,032, issued Jul. 25, 1989, describes a personal portable computer that includes a display monitor adjustment. The invention is a complete computer, portable and compact for its 1989 time period. One of its claims is a spring means for adjusting its display screen by allowing the bottom of the display screen to tip outward. While this was a helpful visual adjustment, it was limited to this specific action, accomplished by a complex ratchet mechanism. It is a design of an outmoded portable, and does not anticipate today's notebook computer, and its operation has no relationship in design or function to the present invention.

Another prior art innovation, is described in a patent for "An Adjustable Display Panel For Portable Computer", U.S. Pat. No. 4,832,419, issued May 23, 1989. While this device relates to the personal portable computer of 1989 and does not anticipate the compact flat notebook or laptop computer, it does recognize the need for display screen adjustment. By a short set of flat levers linked by hinges and curved guide tracks, the display screen is allowed to raise in height and tilt in a fixed arc. Additional screen tilt is accomplished by a saddle that the whole computer frame rests on. It provides additional adjustment by moving in an arc on its yoke and base.

Manipulating this terminal package could provide convenience for earlier portable computers of this portable sewing machine shape, but has no way of benefitting the present day compact and light weight notebook and laptop computers built to travel in a brief case. In fact, the simple adjustment stands for today's personal computer monitors have made this invention outmoded even for largely personal computers. It is designed for the three component system of the monitor, keyboard panel, and terminal; it cannot accommodate either personal computers or notebook types; it uses a series of flat brackets with hinges in between; it pivots on a spring mechanism; the display panel is raised following the arc of a curved track and locks in place by compression in the end of the tracks; it cannot be used with notebook computers.

Another recognition of the advantage of screen adjustment is found in a patent for a "Portable Computer Provided With A Tilting Screen Articulated Thereon By Tilting Linkage With A Bent Shape", U.S. Pat. No. 5,107,402, issued Apr. 21, 1992. This patent relates to a design of an entire computer that is vertical in structure with a separate keyboard, like the personal computers used in households today. Like the previously discussed patent, it does not provide a mechanical operation that could be useful to today's compact notebook. The working attachment to the screen section is a cranked bent lever. The screen moves from one open face vertical position to roughly the same plane, able to tilt slightly. The display screen when closing moves to its vertical resting position, is folded back against the vertical terminal, and the keyboard is then clipped onto the screen and the terminal making a total vertical package, similar in shape and size to a small traveling utility bag.

FIG. 7 of the '402 patent shows an alternate articulation device which incorporates a connecting bar to eliminate twist or torque in the display section's operation. In addition, the bent crank like brackets, of this prior art alternate, are controlled by a long coiled spring that exerts frictional pressure on the connecting rod by applying pressure against phalanges on a mechanism that encompasses the connecting rod. These phalanges, held against rings, maintain a selected position by friction applied by the spring and its mechanism that encircles the connecting rod or axle.

While prior art in the form of a shelf design attempts to address ergonomic problems of the notebook or laptop computer, it offers more strain than benefit. Besides being a cumbersome piece of additional equipment, it mistakenly sacrifices the needs of the back, the neck, and the eyes to protect the wrist.

U.S. Pat. No. 5,255,214 discloses a screen display support for a portable computer comprised of two arms hinged to the case and pivoted to the screen display so as to allow the screen to be swung towards the front of the case and angularly adjusted. While this allows some improvement in that the screen can be tilted up from viewing or swung towards the user, some bending over would still be necessary as the screen is not able to be moved up appreciably in relation to the viewer's eyes in the various adjusted positions.

Other prior art does not present display screen adjustment mechanisms suitable to the notebook or laptop computers in use today. Those inventions that are available are designs for a specific computer type that bears no resemblance to what is used today. While most include attempts at screen adjustment, none have come into common use. They are intended for computer configurations no longer popular. Their mechanics offer no practical means of adjusting today's portable designs. Their mechanics are bulky and complex and do not solve the postural and visual problems of the notebook or laptop computer.

The object of the present invention is to provide a practical ergonomic mounting for a computer display screen which allows the screen itself to be properly positioned with respect to the user to minimize eye strain and postural problems without compromising other uses of the computer.

SUMMARY OF THE INVENTION

The above recited object of the invention, as well as others which will become apparent upon a reading of the following specification and claims, are achieved by a mounting mechanism including a support structure comprised of one or more support members holding the display screen housing which support structure has a hinged connection at one end to the computer casing to allow the support and flat display screen housing to be swung up from a down position overlying the computer casing. The support member (or members) are interengaged with the display screen housing by a slidable connection creating an extension-retraction relationship allowing the screen display housing to be extended on the one or more support members so as to be shifted up to be located substantially closer to the eyes of the operator. The support member or members also have a pivotal connection to the screen display housing which allows the screen display to be tilted back for optimal viewing after being shifted to its raised position.

The one or more support members preferably comprises a single central supporting panel member having a hinged connection at one end to the rear edge of the computer casing. The panel member is normally stored flat in a recess in the back of the screen housing, when not in use. When stored, the upper end of the panel member is pushed against the top end of the recess in the display screen housing.

To deploy the display screen, the panel member and display screen are first swung up together on the hinged connection. From this upright position, the screen display housing can be pulled upwardly on the panel member, to be shifted to an extended position above the computer casing. The panel member mounts the screen display on pivot shafts which are held by attachments that are slidable down concealed spaces extending along either side of the recess in the rear of the screen display screen at it is shifted upwardly. The panel member may be tilted forwardly on its hinged connection to the computer casing to also swing the display screen forwardly as it is shifted upwardly closer to the user's eyes. After reaching its fully extended, raised position, the display screen also can be tilted back on the pivot shaft to a desired viewing angle.

In this position, back and neck strain are reduced because the screen can be put in a closer raised position where there is no need to lean forward. What also takes place is improved readability as the closeness of the screen to the viewer's eyes makes details and fonts sharper to the extent that the work use of the notebook computer rivals that of the personal computer.

In a second embodiment, the display screen is mounted on a pair of elongated spaced apart support arm members, each received in a respective concealed pocket in the rear of the display screen housing, and are pulled out to shift the display screen upwardly. They are each hinged at one end to the computer casing and pivoted at their other ends to the screen display housing to allow tilting adjustments.

Some of the advantages of the present invention over the prior art are:

(A) Strain on the user's back from long term use is reduced.

(B) The neck strain from constantly leaning or hunching forward to recognize details is eliminated.

(C) Eye strain is reduced by providing better clarity by moving the screen display closer to the user's eyes.

(D) The notebook or laptop is provided with a greater comfort level that makes it able to compete against the full sized personal computer.

(E) Greater freedom of selection of working positions is allowed, while including the option of using the standard working positions.

(F) There is no complex series of cumbersome levers and unsightly hinges.

(G) When not in use, the support components are stored unobtrusively.

(H) The same compact and light weight traveling convenience of the notebook computer is maintained, while furnishing outstanding new advantages.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
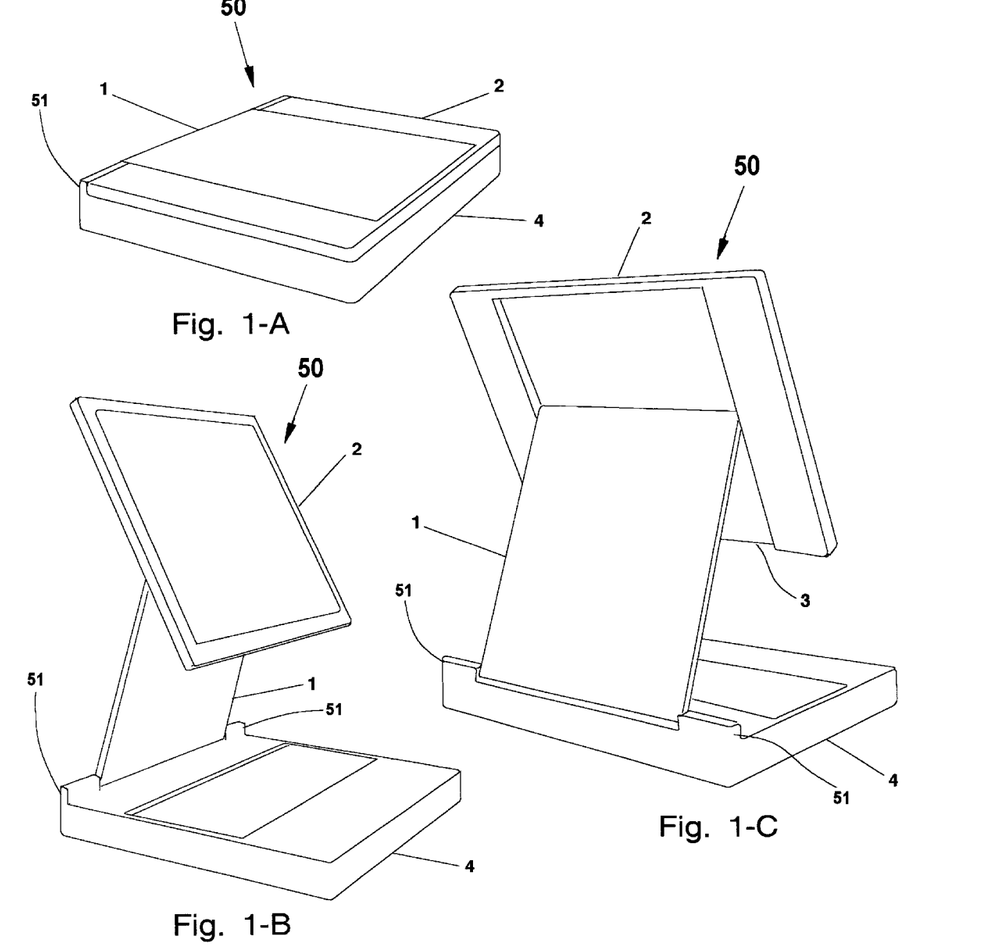
FIG. 1A is an orthographic view of a notebook computer having a first embodiment of a screen display ergonomic mounting according to the invention, the screen display section shown in its closed position.
FIG. 1B is a front orthographic view of the computer shown in FIG. 1A with the display screen section deployed into the improved viewing position according to the concept of the present invention.
FIG. 1C is a rear orthographic view of the computer as shown in FIG. 1B.

The ergonomic mounting for a screen display according to the invention as applied to a notebook computer is shown in FIGS. 1A to 1C.

FIGS. 1A–1C are exterior views of a notebook computer 50 including a computer casing 4 and a screen display housing 2, which in its stored condition lies flat on the top of the computer casing 4.

The generally rectangular screen display housing 2 is connected to the computer casing 4 by a support structure, in this embodiment comprised of a central supporting hollow panel member 1 having a hinged connection comprising a pair of hinged connections 53 between lower portions of the panel member (FIG. 2) to a raised rear edge 51 at the rear of the computer casing 4 so as to be able to be swung up out of a recess 3 in the rear of the screen display housing 2, bringing the screen display 2 to a generally upright position at the rear of the computer casing 4.

The screen display housing 2 may be extended away from the hinged connections 53 of the central panel member 1, after being hinged up to be clear of the computer casing 4 by pulling up. This repositioning is accomplished by slidable connections between upper portions of the screen display housing 2 and the central panel member 1 allowing the screen display housing 2 to be extended or retracted with respect to the central panel member 1.

In the preferred embodiment disclosed, this is accomplished by the upper end 1A of the panel member 1 being provided with a pair of pivotal connections 52 (FIG. 2), each being slidable within the panel member 1. Each side of the upper end 1A of the panel member 1 slidably mounts shaft attachments 11 each having a pivot pin 10 projecting out through slots 17 formed in the portions of the screen display housing 2 defining the sides of the recess 3.

When the panel member 1 is hinged up out of the recess 3, the shaft attachments 11 are slidable, such that the screen display housing 2 is able to be extended on the panel member 1, producing an upward movement to a higher position above the computer casing 4.

As noted, the supporting panel member 1 can be inclined forwardly on its hinged connections 53 so that as the screen display housing 2 moves upwardly, it also moves forwardly to be positioned nearer the eyes of the computer user.

Figure 2:
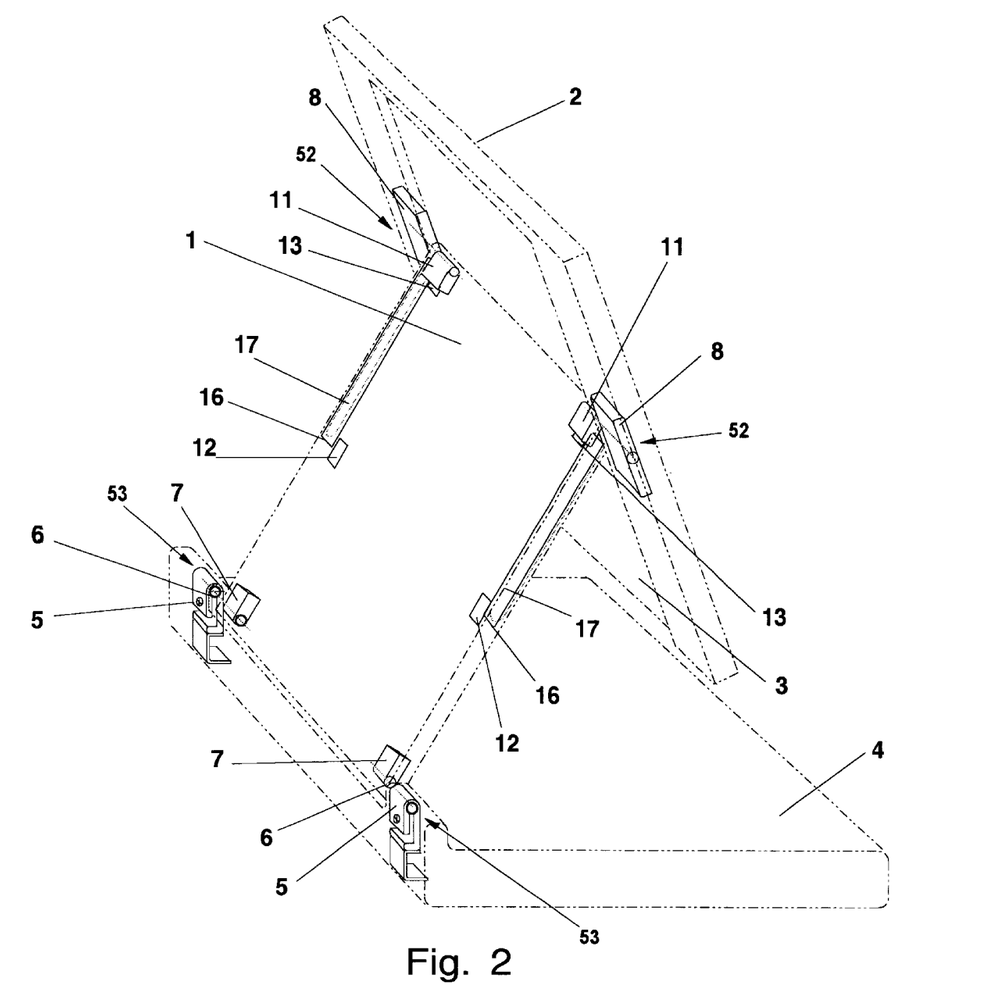
FIG. 2 is a orthographic view of the components of the screen display ergonomic mounting according to the invention, with the computer casing and display screen housing shown in phantom lines.

The screen display section housing 2 has two pivotal connections 52 to the upper sides of the panel member 1 defining a fixed axis of rotation, such that the screen display housing 2 can be tilted back, as shown in FIGS. 1B, 1C and 2. The shaft attachments 11 form a part of each pivotal connection 52.

FIG. 1A shows that, when the computer is closed, the mounting according to the invention is completely concealed. In this condition, only the top surface of the supporting panel 1 shows, which is flush with the back surface of the screen display housing 2.

Further details of the hinging and pivotal connections 53, 52 are shown in FIGS. 2 and 4A–4E. As noted above, the lower end of the supporting panel member 1 is attached to the computer casing by a pair of hinged connections 53, which each include a hollow shaft 6, which in the preferred embodiment, is received in a split socket 5 contained within the computer casing 4. The split sockets 5 are supported by U-brackets 54 that comprise a secure means of attachment to the computer casing 4. In the preferred embodiment, a friction control screw 18 is included in each of the split sockets 5 to allow setting of the tightness of the frictional grip on the hollow shaft 6. The shafts 6 are integral with shaft attachment blocks 7 fixed within the lower corners of the hollow panel member 1.

Figure 4:
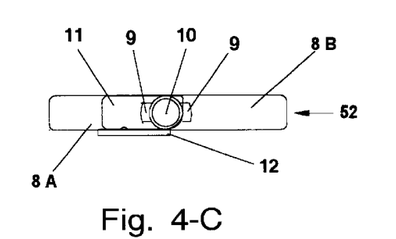
FIG. 4A is an end view of one set of the support panel member hinging connection components and the frictional holding device that maintains the screen display in an adjusted swung forward position.
FIG 4B is a perspective view of the hinging connection components shown in FIG. 4A.
FIG. 4C is an end view of the support panel member upper pivot connection components.
FIG. 4D is a perspective view of the components shown in FIG. 4C.
FIG. 4E is a partially exploded view of the components shown in FIG. 4C.

As seen in FIG. 4E, the pivot pins 10 are each received in a respective two piece pin encasement 8A, 8B fixed at the midpoint of each inner side of the housing 1 adjacent the recess 3, spaced so as to frictionally grip a respective pivot pin 10 (FIG. 4D). Friction pads 9 assist in creating an adjustable frictional positioning of the screen display housing 2 on the upper end of panel member 1. This enables holding of the desired tilted position of the screen display housing 2.

Figure 5:
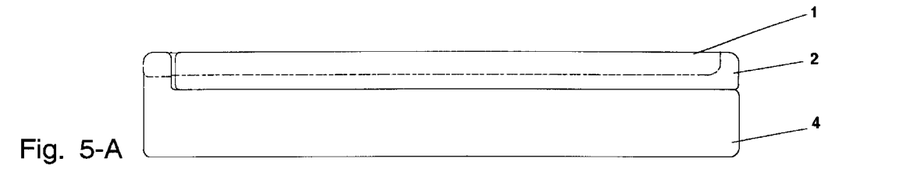
FIG. 5A is a side view of the computer casing and screen display in the stowed position.
FIG. 5B is a side view of the computer casing and screen display shown in FIG. 5A shown in phantom lines showing with one set of hinging and pivot connection components.
FIG. 5C is a diagrammatic front end view of the certain pivot connection components.
FIG. 5D is a fragmentary side view of the computer and screen display in phantom lines showing one set of hinging and pivot connection components.

FIG. 2 shows the screen display housing 2 in the normal viewing position. After the screen display housing 2 is swung out of recess, it can be slid upwardly on the panel member 1 to be extended. This is done with the screen display housing 2 and central panel member 1 flat and parallel to each other. When the screen display housing 2 reaches the upper end of the panel member 1, the interference condition between the panel member 1 and a screen display housing 2 is relieved, allowing relative tilting of the screen display housing 2 about pivot pins 10 (FIG. 5D). The screen display housing 2 is held in either the retracted or extended position by set pads 12, 13 engaging the shaft attachments 11 in each respective position (FIGS. 4C–4E, 5B and 5D).

An elongated cover 16 overlies each slot 17 to prevent viewing of the inside of the panel 1 (FIG. 5D). Each cover 16 is attached with a pin 19 to a respective shaft attachment 11 (FIG. 4E). When the desired tilt is reached, the frictional pads 9 hold the adjusted tilt of the screen display housing 2.

Figure 3:
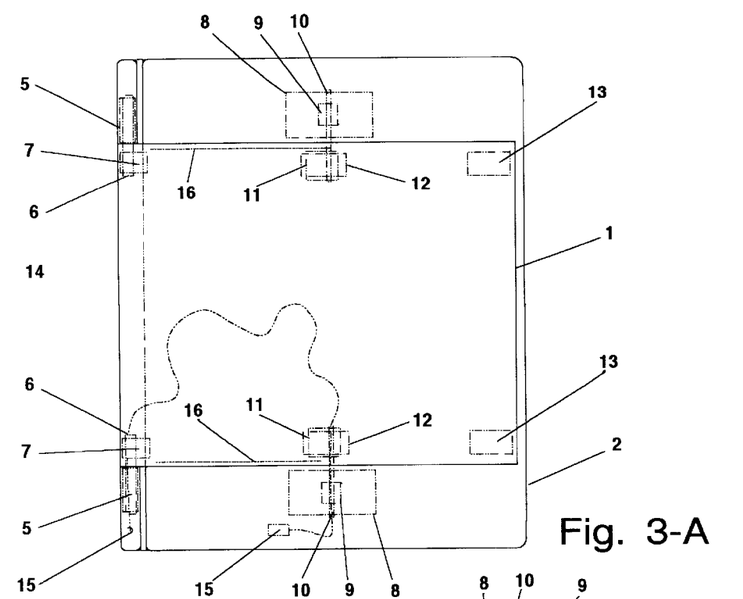
FIGS. 3A and 3B are top views of the screen display ergonomic mounting in the closed and in the extended positions showing the position of the wiring in a closed and an extended position of the display screen, respectively.

FIG. 3A is a top view of the computer casing 4 shown in the closed position. The wiring bundle 14 (shown diagrammatically) from the components in the computer casing 4 passes through one of the hollow shafts 6 and through an opening in the shaft attachment 7 which is also hollow, and thence making arching bends within a cavity 58 (FIGS. 6A and 6B) in the hollow supporting panel member 1, extending to one of the hollow shaft attachments 11 and pivot pins 10, and thence into the display screen 2 through 15.

FIG. 3B shows in phantom lines a diagram of the display screen housing 2 after it is hinged up and extended on the panel member 1. This depiction shows that the wire bundle 14 in the panel member 1 is able to extend when the screen display housing 2 is extended as shown in FIG. 3B.

Figure 6:
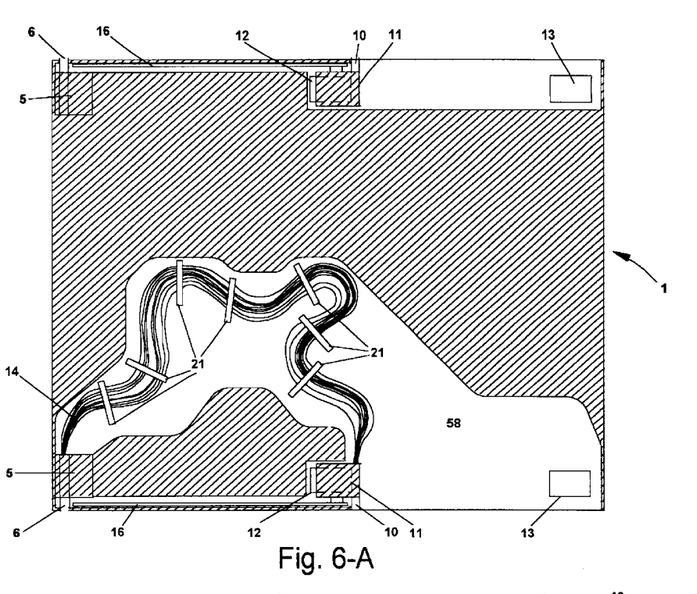
FIG. 6A is a horizontal sectional view taken through the panel member showing the wiring harness position with the display screen stowed.
FIG. 6B is horizontal sectional view taken through the member, showing the wire harness position with the display screen extended.
FIG. 6C is a tranverse sectional view taken through the panel member.
FIG. 6D is a perspective fragmentary view of a set of wires held in a wire guide.
Figure 7:
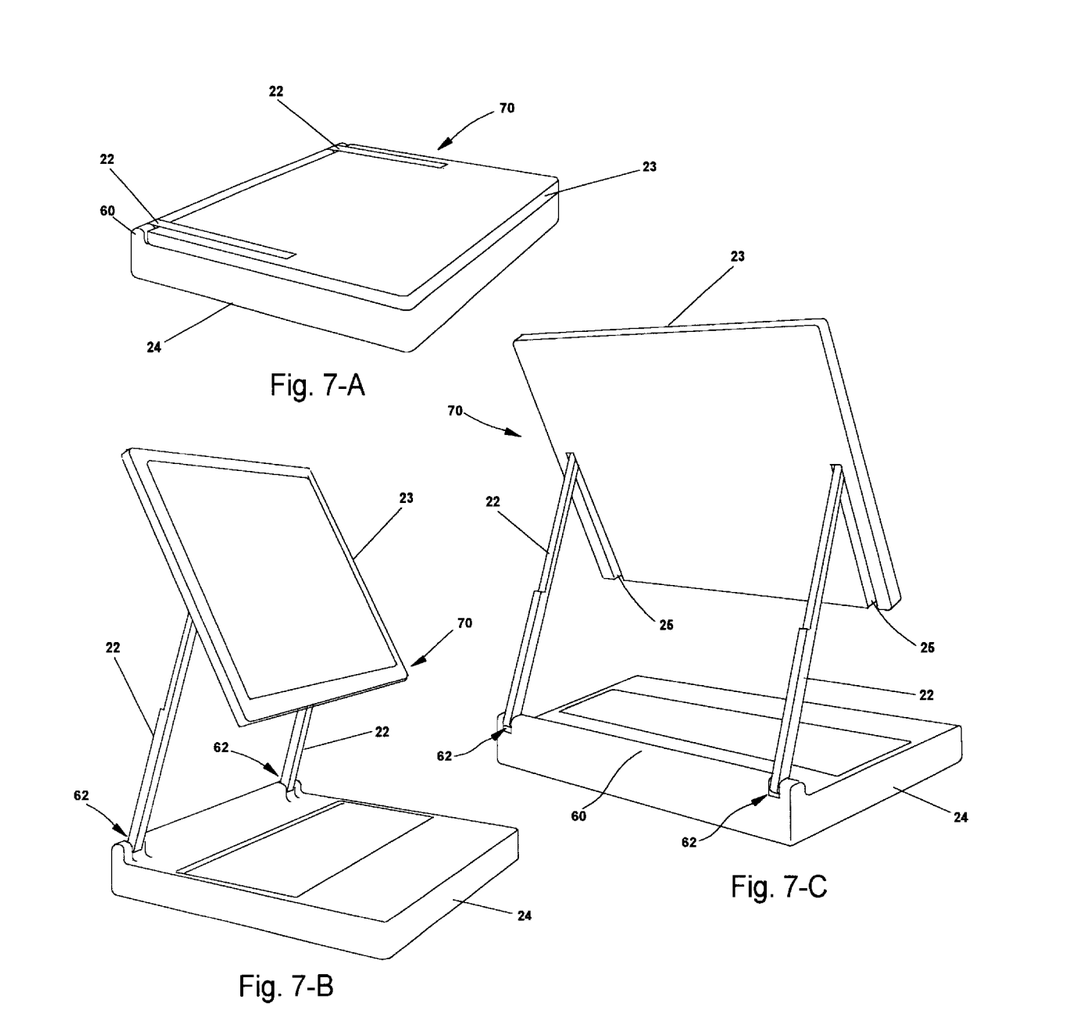
FIG. 7A is a orthographic view of a notebook computer having a display screen ergonomic mounting according to a second embodiment of the invention, the screen display shown in its closed position.
FIG. 7B is a front orthographic view of the computer shown in FIG. 7B with the screen display deployed into the improved viewing position according to the present invention.
FIG. 7C is a rear orthographic view of the computer with the display screen display as shown in FIG. 7B.

FIGS. 6A and 6C show that the wire bundle 14 is confined in a flat cavity 58 within the panel member 1. Wire holding clips 21 (FIG. 6D) slidable in the cavity maintain the wires in the bundle 14 in a flat, spread out condition. In FIG. 6A, the wire bundle is shortened with the housing 2 retracted on the panel member 1. FIG. 6B shows the wire bundle 14 stretched out, the clips 21 sliding in cavity 58 to allow this to occur, as the screen display housing moves to an extended position. This arrangement prevents twisting, excessive bendings, or tangling of the wires 14.

When closing the notebook computer 50, or returning the screen display housing 2 to the typical working position of conventional notebook or laptop computers, the screen display housing 2 is tilted back into the same plane as the panel member 1. The screen display housing 2 can then be retracted downwardly on the panel member 1.

The benefit of this invention, in particular for notebook or laptop computer users, can readily be appreciated by observing present day users in action. Their backs and shoulders are usually tense and rigid. Their necks stretched uncomfortably forward, as their eyes squint to detect finer details and small displays of printed pages.

This invention allows the screen to be raised to a more visually comfortable height, moved forward, and then tilted to the angle most comfortable and easily viewable by the user. The closer screen position provides vastly increased visual clarity. The adjustable closeness also makes it a more intimate part of the user's personal presence. Working on it also becomes more comfortable and relaxed because the closer position of the screen overlaps the keyboard and thus allow it to be comfortably distant for the hands while the screen comes closer to the eyes. It offers much needed postural and visual advantages to notebook or laptop computer design.

FIGS. 7A–12B show a second embodiment of a laptop computer 70 incorporating the invention.

The generally rectangular screen display housing 23 is connected to the computer casing 24 by a support structure comprising a pair of parallel elongated, hollow arm support members 22 each having a hinged connection to a raised rear edge 60 of the computer casing 24 so as to be able to be swung up, bringing the screen display housing 23 to a generally upright position at the rear of the computer casing 24.

The display housing 23 may be extended up from the hinged connection 62 of the arm members 22, after being swung to an upright position. The screen display housing 23 may also be swung forwardly as well since the arm support members 22 may be hinged forwardly to be inclined from the full upright position. These repositionings are accomplished by an extension-retraction arrangement included in the interengagement between the screen display housing 23 and the arm support members 22, allowing the screen display housing 23 to be raised or lowered on the arm support members 22.

In the second embodiment shown, this is accomplished by the upper ends of the arm support members 22 having a slidable interengagement with the screen display housing 23. The upper ends of the arm support members 22 are received in hidden elongated pockets 64 (FIG. 11E) aligned with exposed slots 25 formed in the rear face of the screen display housing 23.

When the arm support members 22 are hinged up, they are slidable out of the pockets 64, such that the screen display housing 23 is able to be extended thereon, producing an upward shifting movement to a higher position over the computer casing 24.

As noted, the arm support members 22 can be inclined forwardly on their hinged connections 62 so that as the screen display housing 23 moves upwardly, it also may be swung forwardly to be positioned nearer the eyes of the computer user.

In addition, the screen display housing 23 has a pivotal connections 66 (FIG. 8) to the upper ends of the arm support members 22, such that the screen display housing 23 can be tilted back, as shown in FIGS. 7B, &C and 8.

FIG. 7A shows that, when the display screen housing 23 is closed, the mounting according to the invention is largely concealed. In this condition, only the rear surface of the lower ends of the arm support member 22 show, which are flush with the top or back surface of the display section housing 23.

Figure 8:
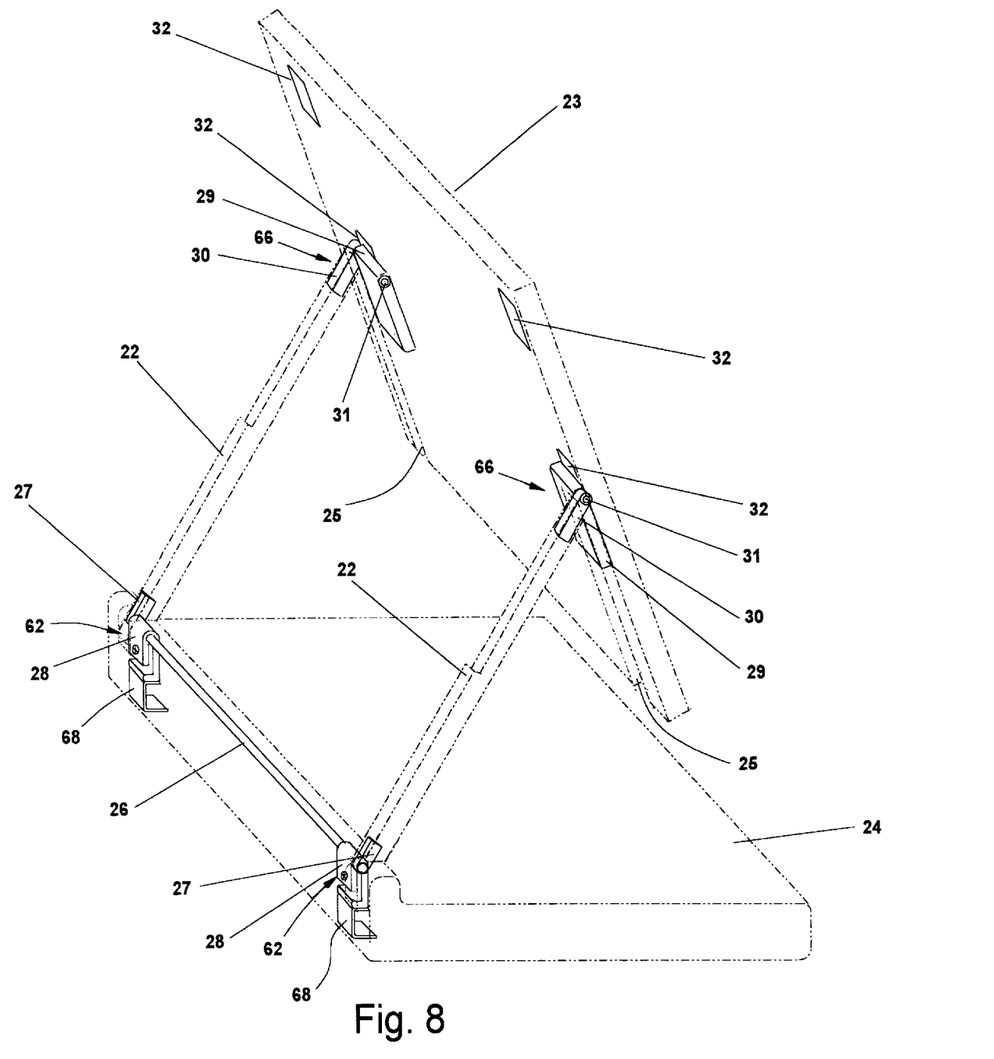
FIG. 8 is an orthographic view of the entire screen display ergonomic mounting according to the invention, with the computer casing and screen display housing shown in phantom lines.
Figure 9:
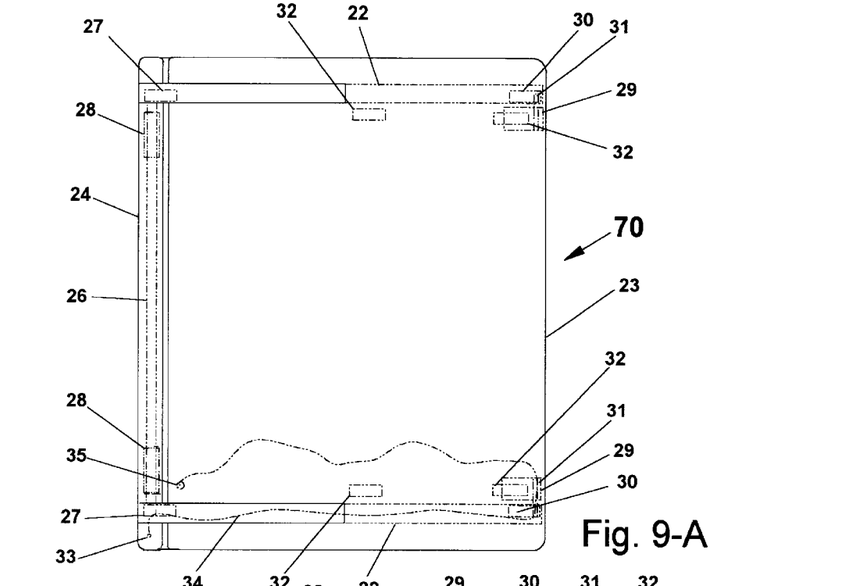
FIGS. 9A and 9B are top views of the screen display in the retracted and extended positions, respectively and showing the deployment of the wiring bundle when the screen display is retracted and extended, respectively.
Figure 10:
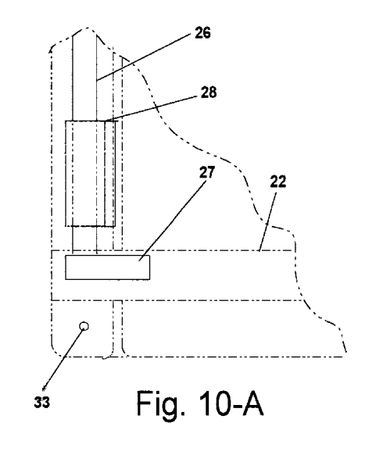
FIG. 10A is a fragmentary top view of one corner of the computer in phantom lines, showing one set of the support arm hinging connection components.
FIG. 10B is an exploded perspective view of the support arm member hinging components shown in FIG. 10A.
FIG. 10C is a plan view of one set of the support arm member pivot connection components with a fragmentary portion of one of support arm members shown in phantom lines.
FIG. 10D is an exploded perspective view of the set of pivot connection components shown in FIG. 10C.
Figure 11:
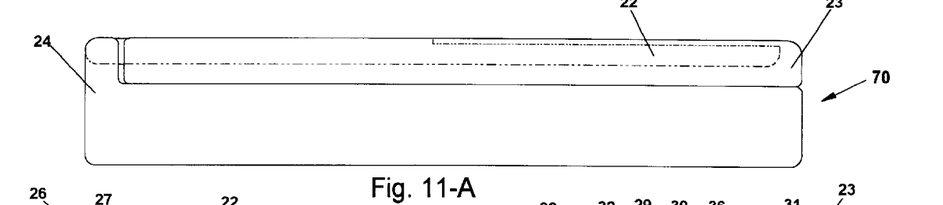
FIG. 11A is a side view of the computer casing and screen display housing in the stowed position.
FIG. 11B is a side view of the computer casing and screen display housing in phantom lines to reveal the hinging and pivot connection components.
FIG. 11C is a fragmentary top view of the computer shown in phantom lines to reveal hinge and pivot connection components.
FIG. 11D is a fragmentary front view of one side of the screen display in phantom lines to show pivot connection components.
FIG. 11E is an enlarged perspective fragmentary view of a portion of the screen display housing.
Figure 12:
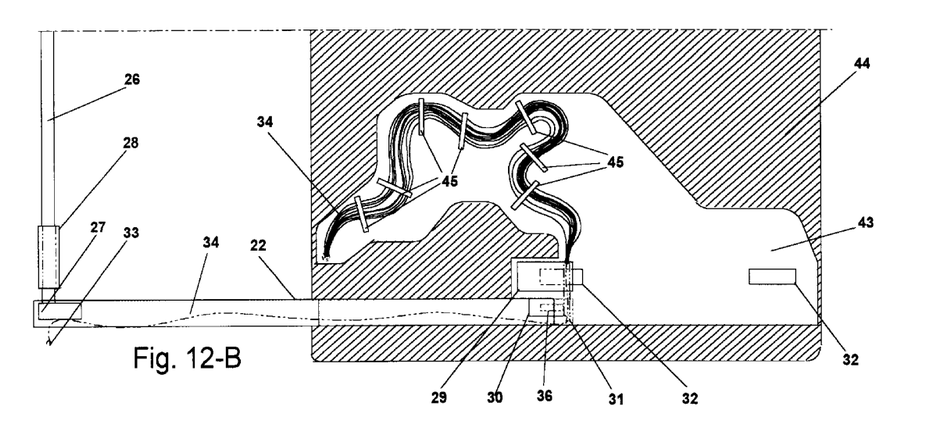
FIG. 12A is a horizontal sectional view taken through the display screen housing, and showing associated hinge and pivot connection components as well as wiring harness in the retracted position of the display screen.
FIG. 12B is a fragmentary view of the parts as shown in FIG. 12A but with the display screen in the extended positions.
FIG. 12C is a fragmentary front view of the display screen housing shown in phantom lines and rotated 90° to show the wiring bundle and one clip.
FIG. 12D is a perspective view of a wiring clip and a segment of the wire bundle.

Further details are shown in FIG. 8. The lower end of each of the arm support members 22 are attached to the computer casing 24 by a hinged connection 62, which includes one end of a solid connecting shaft 26, which in the preferred embodiment, is received in a respective hinge contained within the rear section of the computer casing 24. The hinges 28 are supported by brackets 68 that are a means of attachment to the computer casing 24. In the preferred embodiment, friction control screws 40 (FIG. 10B) are included in each of the hinges 28 to allow setting of the frictional forces holding a given inclination of the arm support members 22. The opposite ends of the solid connecting shaft 26 are fixed in shaft attachments 27 mounted in the lower corners of the arm support member 22.

The pivotal connections 66 to the upper ends of the arm members 22 include two piece pin attachments 30A, 30B which are slidable in respective concealed pockets 64 (FIG. 11E). The pin attachments 30A, 30B grip a hollow pin 31 fixed to a traversing guide 29 slidable within an interior space adjacent the pockets 64, the hollow pins 31 projecting through a slot 42 (FIG. 11E) to reach the two piece pin attachment 30A, 30B (FIG. 10D).

This embodiment also has a fictional set pad 36 (FIG. 10D) that grips the pins 31 to hold a desired tilted position of the screen display housing 23. The pad 36 is received in a recess 38 and a frictional adjustment screw 39 engages a plate 37.

FIG. 8 shows the screen display housing 23 in the normal viewing position. After the screen display section 23 is hinged up, it can be shifted upwardly on the arm members 22 to be extended, with grooves 25 guiding this motion. This motion is parallel to the arm support member 22 which allows their upper ends to be pulled out of the concealed pockets 64 (FIG. 11E) in the screen display housing 23. A desired tilt may be set, the frictional set pads 36 holding the adjusted tilt of the screen display section 23. Friction pads 32 hold the screen display housing 23 in the extended or retracted position.

The screen display housing 23 is swung open on hinge connections 62 which includes the ends of a solid shaft 26. The forward inclination angle to which the arms support members 22 are set is maintained by squeezing of the hinges 28 that encircle ends of the shaft 26.

FIG. 9A shows a top view of the computer 70 as seen in the closed position. Wiring bundle 34 coming from the components in the computer casing 24 passes through a hole 33 and into one of arm support members 22 which is hollow, and thence extending up the arm support member 22, through hollow pin 31 and into the screen display housing 23. The wiring bundle 34 extends to the point of connection 35 to the display circuit.

FIG. 9B shows the display housing 23 when it is extended on the arm support members 22, pulled out from the concealed pockets 64. FIGS. 12A, 12B show that the wiring bundle 34 in the screen display housing 23, is able to assume a curve when the screen display housing 23 is opened as shown in FIG. 12B. This takes place in a controlled fashion by properly confining wiring bundle 34 in a cavity 43 in the screen display housing 23 using clips 45 sized to be slidable in cavity 43. The multi-strand wires 34 (FIGS. 12A–12D) at this point are individual and confined so they remain in a flat array but able to assume an increased degree of curvature naturally.

What is claimed is:

1. A portable computer having a screen display housing with an adjustable mounting to a separate computer casing, said adjustable mounting comprising:

a support structure connecting said screen display housing to said computer casing;

a hinging connection between lower portions of said supporting structure and a rear side of said computer casing, said hinging connection allowing said support structure to be swung up about a fixed axis from a closed position overlying said computer casing to a position extending generally upwardly from said computer casing, said support structure extending across a rear portion of said screen display housing with said screen display housing in said closed position overlying said computer casing;

said support structure having a slidable connection to said screen display housing so as to allow said screen display housing to be shifted on said support structure to enable said screen display housing to be positioned further away from said lower portions in an extended position after said support structure is swung up from said computer casing on said hinged connection;

said slidable connection of said support structure to said screen display housing also includes a pivotal connection to said screen display housing enabling tilting adjustment of said screen display housing on said support structure in a tilted position.

2. The portable computer according to claim 1, further including frictional engagement means maintaining said screen display housing in said extended and tilted positions.

3. The portable computer according to claim 1 wherein said support structure comprises a pair of spaced apart arm support members, each hinged at one end to the rear of said computer casing to provide said hinged connection and each arm support member pivoted at an upper end to a slidable attachment slidable within said screen display housing to allow said shifting and pivoting of said screen display housing thereon.

4. The portable computer according to claim 3 wherein each of said arm support members is received in a respective one of a pair of recesses in said screen display housing to allow pivoting to cause tilting adjustment thereof only when said arm support members are fully withdrawn from said recesses.

5. The portable computer according to claim 1 wherein said support structure comprises a hollow panel member centered on said computer casing, and a wire bundle providing electrical connections to said screen display housing extends through said hollow panel member.

6. The portable computer according to claim 1 wherein said support structure comprises a central panel member, said screen display housing having a central recess receiving said panel member when said panel member and screen display housing are swung down onto said computer casing to said closed position.

7. The portable computer according to claim 6 wherein said slidable connection between said support structure and said hollow central panel member includes a pair of attachments slidable within a respective side of said panel member, each attachment providing a pivot connection of a respective side of said panel member and said screen display housing enabling said tilting adjustment of said screen display housing on said upper portions of said central panel member.

8. The portable computer according to claim 7 wherein said central panel member and said display screen housing interfere with each other to prevent tilting adjustment until said screen display housing is fully shifted out on said central panel member after said central panel member is swung up from said computer casing.

9. The portable computer according to claim 5 wherein said wire bundle is held in a flat spread out condition by a series of clip slidable within said hollow central panel member.

* * * * *